(12) United States Patent
Cooper et al.

(10) Patent No.: US 6,654,888 B1
(45) Date of Patent: Nov. 25, 2003

(54) INSTALLING AND CONTROLLING TRIAL SOFTWARE

(75) Inventors: Thomas Edward Cooper, Louisville, CO (US); Robert Franklin Pryor, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/476,657

(22) Filed: Dec. 31, 1999

(51) Int. Cl.[7] .............................................. H04L 9/00
(52) U.S. Cl. ...................... 713/190; 380/201; 380/277; 717/174; 714/38; 713/162
(58) Field of Search ................... 714/38, 39; 717/1–11, 717/174; 705/51, 52, 57, 56, 75, 71; 713/168, 171, 190, 162; 380/201–203, 228, 281, 284, 277

(56) References Cited

U.S. PATENT DOCUMENTS

| | | | | |
|---|---|---|---|---|
| 4,740,890 A | | 4/1988 | William | 364/200 |
| 5,327,563 A | | 7/1994 | Singh | 395/700 |
| 5,341,429 A | * | 8/1994 | Stringer et al. | 380/23 |
| 5,563,946 A | | 10/1996 | Cooper et al. | 380/4 |
| 5,598,470 A | | 1/1997 | Cooper et al. | 380/4 |
| 5,628,015 A | | 5/1997 | Singh | 395/186 |
| 5,689,560 A | | 11/1997 | Cooper et al. | 380/4 |
| 5,737,416 A | | 4/1998 | Cooper et al. | 380/4 |
| 5,757,907 A | * | 5/1998 | Cooper et al. | 380/4 |
| 5,757,908 A | | 5/1998 | Cooper et al. | 380/4 |
| 6,195,432 B1 | * | 2/2001 | Takahashi et al. | 380/9 |

* cited by examiner

*Primary Examiner*—James P. Trammell
*Assistant Examiner*—Pierre E. Elisca
(74) *Attorney, Agent, or Firm*—Blakely Sokoloff Taylor Zafman LLP

(57) ABSTRACT

According to one aspect of the invention, a method of creating a trial software product on a target system is provided. The method consists of intercepting file system calls from an installation process associated with a full software product and, responsive to a write request from the installation process, encrypting data associated with the write request if the write request is associated with one of a predetermined set of critical product files. The predetermined set of critical product files including those product files comprising the full software product that have been identified as files to which access is to be controlled.

18 Claims, 9 Drawing Sheets

US 6,654,888 B1

INSTALLING AND CONTROLLING TRIAL SOFTWARE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to limiting access to a software product. More particularly, the invention relates to a mechanism which allows a trial version of a software product to be created without altering the installation program or the product code.

2. Description of the Related Art

If users had an opportunity to try software products before having to make decisions on whether or not to purchase the products, it is generally believed that more copies of software products could be sold. It is also believed that customer satisfaction would be higher. Consequently, both the manufacturers and purchasers of computer software products would be well served if purchasers were given reasonable access to trial versions of software products for purposes of making a purchasing decision.

Typically, software manufacturers have attempted to provide advanced access to their software products by producing demonstration versions having limited functionality. Another prior solution has been to provide prospective purchasers with a fully functioning trial product that is operable for only a limited amount of time by altering the product code and then encrypting the original product code. After the user is satisfied that the product will meet his/her needs, the user can purchase "fixes" for the altered product code or purchase a key to decrypt the original code.

While these approaches have had some success in the market, they have several limitations. For example, because manufacturers create these demonstration versions in advance of their use, default installation options must typically be selected. As a result, the demonstration versions are not customizable at the time of installation by the user and may not include some of the exotic options users would like to examine. Another limitation of these prior approaches is the cost to the software manufacturer. Since each software product is unique, creation of trial products typically involves a number of highly skilled individuals. For purposes of identifying areas where functionality should be limited, one or more individuals that are intimately familiar with the product may be required. Additionally, one or more programmers are required to alter the product code and/or the corresponding installation program.

In view of the foregoing, it is desirable to provide an automated process that can dynamically create a trial product from a full product without necessitating alterations to either the product code or the installation program. Additionally, it would be advantageous if the automated process were operative at the time of installation in order to allow user customization.

BRIEF SUMMARY OF THE INVENTION

A method of creating a trial software product on a target system is provided. The method consists of intercepting file system calls from an installation process associated with a full software product and, responsive to a write request from the installation process, encrypting data associated with the write request if the write request is associated with one of a predetermined set of critical product files. The predetermined set of critical product files including those product files comprising the full software product that have been identified as files to which access is to be controlled.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
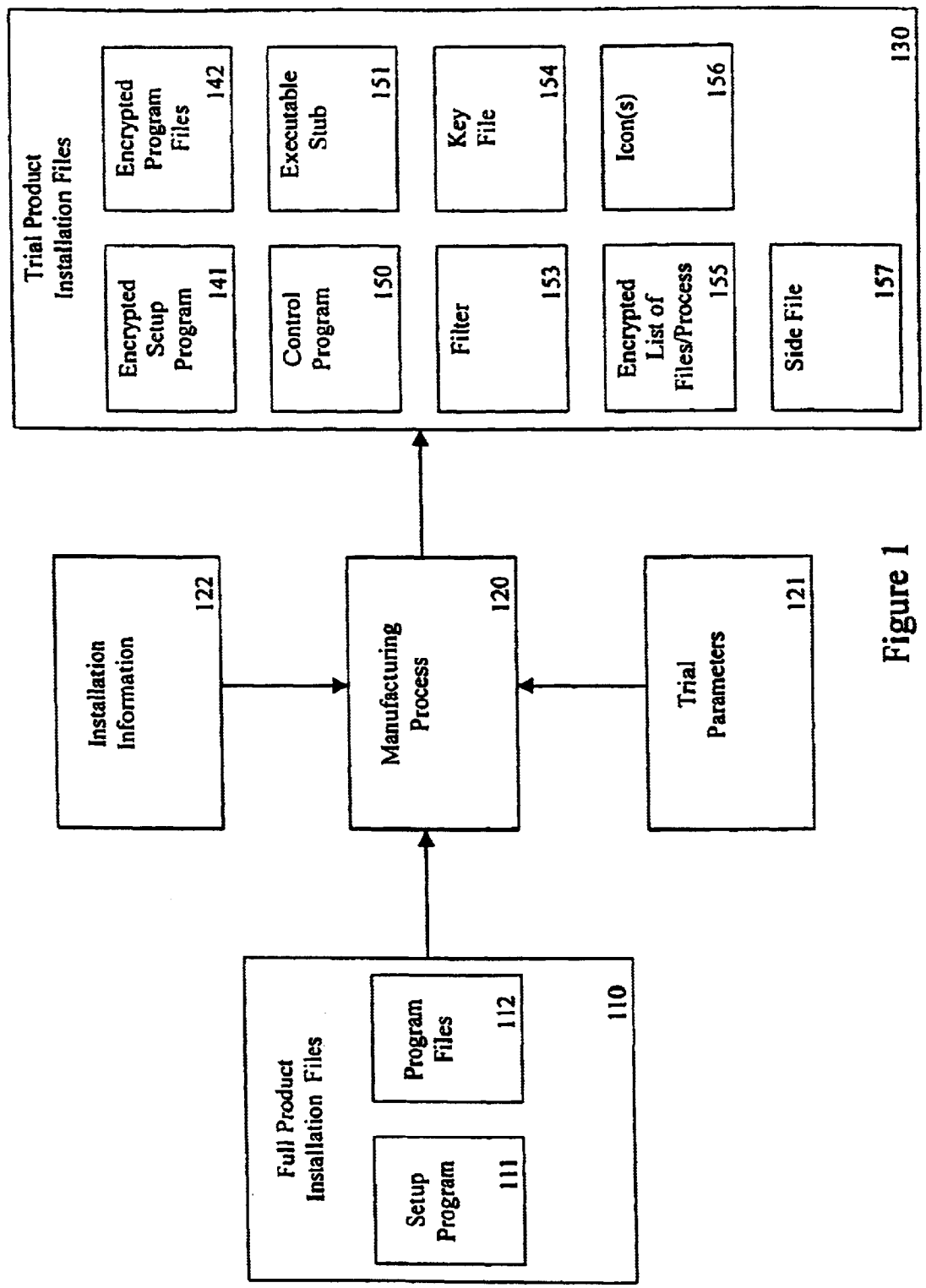
FIG. 1 is a block diagram that conceptually illustrates the result of a front-end manufacturing process according to one embodiment of the present invention.

A method of installing and controlling trial software is described. According to one aspect of the present invention, an automated mechanism is provided for creating a trial product from a full product. Importantly, the automated mechanism does not require modification of either the product code or the installation program. Advantageously, in this manner, both the time and cost associated with generating trial products are reduced. According to another aspect of the present invention, the trial product is dynamically created as the product files are installed onto a target system. Additionally, in one embodiment, the standard installation program that is packaged and delivered with the full product may be utilized to facilitate the trial product generation.

Thus, each user has the opportunity to produce a trial product that is tailored for his/her intended use by selecting from the full range of custom installation options. According to yet another aspect of the present invention, during a front-end manufacturing process, icons may be harvested from various executables that are part of the full software product. Subsequently, during the installation process, the harvested icons may be dynamically associated with trial executables. In this manner, regardless of whether the user is running a trial version of the software product or the full software product, the operating system behavior and the user interface to the software product will be consistent.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, flash memory, magnet or optical cards, or other type of media machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

While for convenience, embodiments of the present invention will be described with reference to a product installation from a CD-ROM or a diskette to a target computer system's hard drive, the method described herein is equally applicable to other installation mechanisms, such as the transfer and installation of product files for trial purposes from a company's Web site, for example.

Front-End Manufacturing Process Overview

According to the present invention, the generation of a trial product from a full product can be broken down into two phases. Briefly, information relating to the full software product and its installation are first captured during a front-end manufacturing process. This information is then used during generation and installation of the trial product. Before describing the generation and installation of trial products, the front-end manufacturing process will briefly be described with reference to FIGS. 1 and 2.

FIG. 1 is a block diagram that conceptually illustrates the result of a front-end manufacturing process according to one embodiment of the present invention. According to this example, full product installation files 110 serve as one of the inputs to a manufacturing process 120. The full product installation files 110 typically include a setup program 111 and one or more program files 112, such as application, data, library, and initialization files, for example, stored on a CD-ROM or diskette. Typically, the program files 112 are encrypted and distributed such that a key is used to decrypt the program files 112 as they are read by the setup program 111.

Based on the full product installation files 110, trial parameters 121, and installation information 122 captured during installation of the full product, the manufacturing process 120 produces trial installation files 130. In this example, the trial installation files 130 include: an encrypted setup program 141, one or more encrypted program files 142, a control program 150, an executable stub 151, a filter 153, a key file 154, an encrypted list of files/processes 155, one or more harvested icons 156, and a side file 157.

As mentioned earlier and as will be explained further below, the installation program associated with the full software product, e.g., setup program 111, may be reused for trial product installation without altering the underlying code. As a result, the encrypted setup program 141 includes an encrypted version of the setup program 111. Additionally, according to one embodiment, an executable that is not part of the full software product may be associated with the encrypted setup program 141. As will be described further below, this association allows the executable to perform processing that is specific to trial product installation prior to execution of the setup program 111.

The encrypted program files 142 are encrypted versions of the program files 112. In one embodiment, encrypted executable files, e.g., those encrypted files having a case file extension, have a different format than other types of encrypted files. The two encrypted file formats and the use of the side file 157 are described further below.

The encrypted list of files/processes 155 represents information collected during the manufacturing process 120 and used by the filter 153 during trial product installation and trial product run-time. The files included in the encrypted list of files/processes 155 include one or more program files 112 that are deemed to be critical program files, e.g., those that need to be re-encrypted during trial product installation in order to prevent the prospective purchaser from taking advantage of the product without purchasing it. The non-critical program files may remain in the clear for purposes of trial product installation. Importantly, sometimes it may be appropriate to protect data that is delivered with a product in addition to the application that creates and manipulates the data. For instance, simply controlling access to a clipart program by encrypting it may effectively prevent the clipart program itself from being exploited; however, if the clipart data files remain in the clear, the prospective purchaser may continue to use the clipart data files after the trial period without purchasing the clipart product. Therefore, during the manufacturing phase, it is important to work with someone that has enough familiarity with the software product to identify critical program files. Alternatively, the manufacturing phase may simply identify all of the program files 112 as critical files, in which case, the encrypted list of files/processes 155 may contain an indication that all program files 112 are to be installed in encrypted form.

Filter 153 is a program that, when installed, sits between the target computer system's operating system and file system and intercepts file input/output (I/O) requests for example, by way of calls backs from the file system driver. Further, this filter, based upon the encrypted list of files/processes 155, determines whether it will intervene to perform encryption or decryption processing on the data associated with the file I/O request.

Control program 150 is a program that enforces the trial period of use. When an attempt is made to read an encrypted file, the control program 150 determines whether or not the trial key corresponding to the file still has some trial usage left. If so, not access to the file is allowed. If the trial key for that file has no usage left, access to the file is denied.

Executable stub 151 is a predefined executable that is run prior to the execution of encrypted application whose purpose is to makes the encrypted file executable. The executable stub 151 of the executing file is utilized to prevent the user from attempting to execute applications that are encrypted. The executable stub 151 is attached to the front portion of the encrypted software product so that this stub is executed whenever the application is run without the installed filter 153.

The executable stub 151 operates differently depending on whether attached to the installation executable or the protected executable. If attached to the installation executable the stub will initiate the execution of the setup program. Otherwise, if attached to the protected executable, the stub will initiate decryption and execution of the trial software. According to one embodiment, executable stubs may be attached to encrypted applications as disclosed in U.S. Pat. No. 5,757,907, entitled "Method and Apparatus for Enabling Trial Period Use of Software Products: Method and Apparatus for Allowing a Try-And-Buy User Interaction" ("the '560 patent"), which is incorporated herein by reference.

Key file 154 stores all encryption keys for use by the control program 150 and executable stub 151.

Icons 156 are provided for use on the user's desktop. Ideally, the icons used by the trial software will be the same as those used by the full version. For this reason, the installation program will extract and use the standard icon.

As described further below, an encryption header may be provided to allow for the determination of whether or not a file is encrypted when that file is stored with clear-text files. In providing the encryption header for the encrypted file, it is important that the file size not be altered because the size may be checked as part of a validation step (unrelated in any way to the concept of the present invention) during installation. Therefore, making the file larger than it is suppose to be can create operational difficulties during installation of the software. The encryption header is further necessary since the file names associated with the encrypted software products cannot be modified to reflect the fact that the file is encrypted, because the other software applications that may be accessing the encrypted product will be accessing those files utilizing the original file names. Thus, altering the file name to indicate that the file is encrypted would prevent beneficial and desired communication between the encrypted software product and other, perhaps related, software products. For example, spreadsheet applications can usually port portions of the spreadsheet to a related word processing program to allow the integration of financial information into printed documents. Changing the hard-coded original file name for the word processing program would prevent the beneficial communication between these software products. The encryption header of the present invention resolves these problems by maintaining the encrypted file at its nominal file length, and by maintaining the file name for the software product in an unmodified form.

Figure 2:
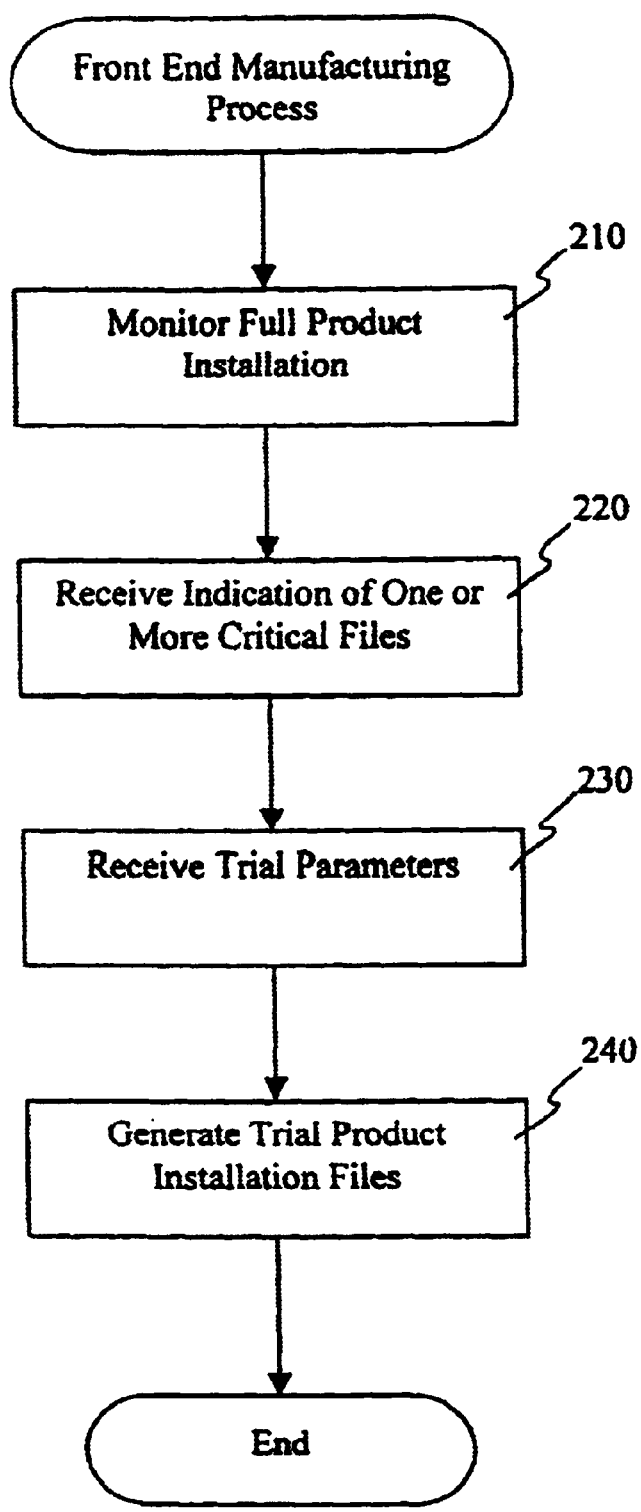
FIG. 2 is a flow diagram illustrating front-end manufacturing processing according to one embodiment of the present invention.

FIG. 2 is a flow diagram illustrating front-end manufacturing processing according to one embodiment of the present invention. In general, it is necessary to perform at least one installation of the full software product as part of the manufacturing process. Preferably, the manufacturing installation step is performed with appropriate installation options selected so as to cause all program files associated with the full software product to be installed. In this manner, a monitoring process that sits on top of the file system during the manufacturing installation step can observe everything the setup program 111 is doing and can capture information for use during the trial product creation. For example, file identification information, such as the relative path from the root installation directory, file name, and/or a cyclic redundancy checksum (CRC) of a predetermined block of the installed program file may be captured. Additionally, process identification information, such as a process name, or a process chain, associated with the one or more processes spawned by the installation process may be recorded.

Briefly, according to one embodiment of the present invention, rather than altering the underlying setup program code, the setup program 111 is encrypted and an executable stub 151 is attached to the encrypted setup program 141. As a result, when the prospective purchaser attempts to run the encrypted setup program 141, e.g., by double-clicking the icon associated with the encrypted setup program 141, what really happens is the executable stub 151 is launched which creates an environment on the target system in which the trial product can be installed and subsequently controlled. After establishing the trial product environment, the executable stub 151 launches the encrypted setup program 141 and as far as the installation application is concerned the product installation proceeds as usual. In reality, however, as will be described below, the trial product environment encrypts one or more of the program files 112 in order to control access to the software product.

As mentioned earlier and as will be explained further below, the installation program associated with the full software product, e.g., setup program 111, may be reused for trial product installation without altering the underlying code. According to the example depicted, an executable that is not part of the full software product, e.g., executable stub 151, is associated with an encrypted version of the setup program 111, e.g., encrypted setup program 141. As will be described further below, this association allows the executable stub 151 to perform processing that is specific to trial product installation prior to execution of the setup program 111. The executable stub includes user input including an indication of one or more critical files and trial parameters, such as the duration of the trial period and any critical files.

An Exemplary Target System

Figure 3:
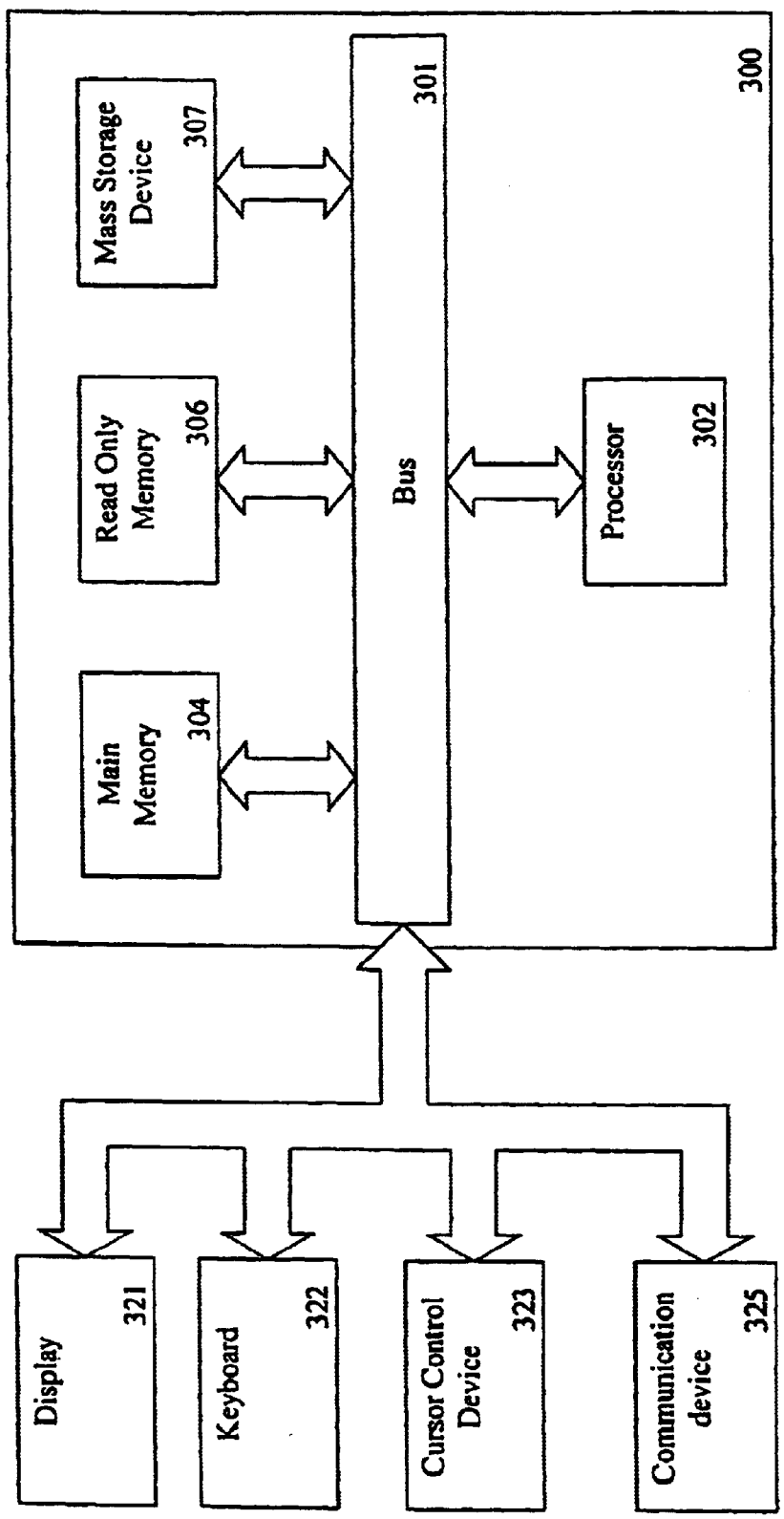
FIG. 3 is an example of a typical computer system upon which one embodiment of the present invention may be implemented.

A computer system 300 representing an exemplary target system upon which features of the present invention may be implemented will now be described with reference to FIG. 3. Computer system 300 comprises a bus or other communication means 301 for communicating information, and a processing means such as processor 302 coupled with bus 301 for processing information. Computer system 300 further comprises a random access memory (RAM) or other dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 also comprises a read only memory (ROM) and/or other static storage device 306 coupled to bus 301 for storing static information and instructions for processor 302.

A data storage device 307 such as a magnetic disk or optical disc and its corresponding drive may also be coupled to computer system 300 for storing information and instructions. Computer system 300 can also be coupled via bus 301 to a display device 321, such as a cathode ray tube (CRT) or Liquid Crystal Display (LCD), for displaying information to an end user. For example, graphical and/or textual indications of installation status, time remaining in the trial period, and other information may be presented to the prospective purchaser on the display device 321. Typically, an alphanumeric input device 322, including alphanumeric and other keys, may be coupled to bus 301 for communicating information and/or command selections to processor 302. Another type of user input device is cursor control 323, such as a mouse, a trackball, or cursor direction keys for communicating direction information and command selections to processor 302 and for controlling cursor movement on display 321.

A communication device 325 is also coupled to bus 301. The communication device 325 may include a modem, a network interface card, or other well known interface devices, such as those used for coupling to Ethernet, token ring, or other types of physical attachment for purposes of providing a communication link to support a local or wide area network, for example. In any event, in this manner, the computer system 300 may be coupled to a number of clients and/or servers via a conventional network infrastructure, such as a company's Intranet and/or the Internet, for example.

An Exemplary Software Architecture

Figure 4:
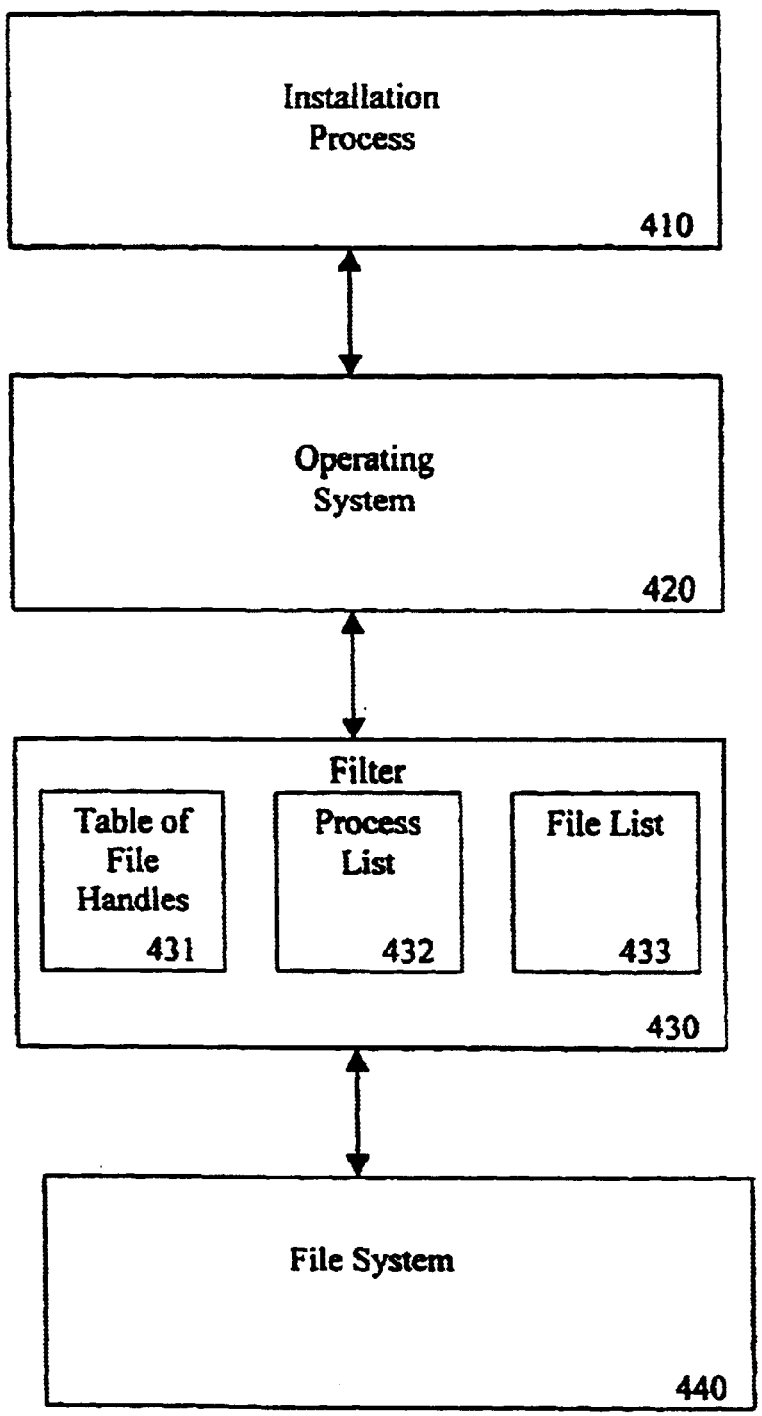
FIG. 4 is a block diagram illustrating a software architecture according to one embodiment of the present invention.

FIG. 4 illustrates an exemplary software architecture hierarchy according to one embodiment of the present invention. According to the embodiment depicted, the installation process 4 410 interacts with the operating system 420. The operating system 420 in turn manipulates the file system 440 through a filter 440. This filter includes a table of file handles 431, a process list 432 and a file list 433. The table of file handles 431 contains a list of all file names and a pointer to their locations. This file is used at runtime to determine whether access to a particular file should be allowed. This method prevents a user from defeating the key protection by moving or copying a protected file after it has been decrypted. The process list 432 is a list of all processes which may access particular keys. The file list 433 is a list of all files which are encrypted and is generated at installation.

Installation Processing

Figure 5:
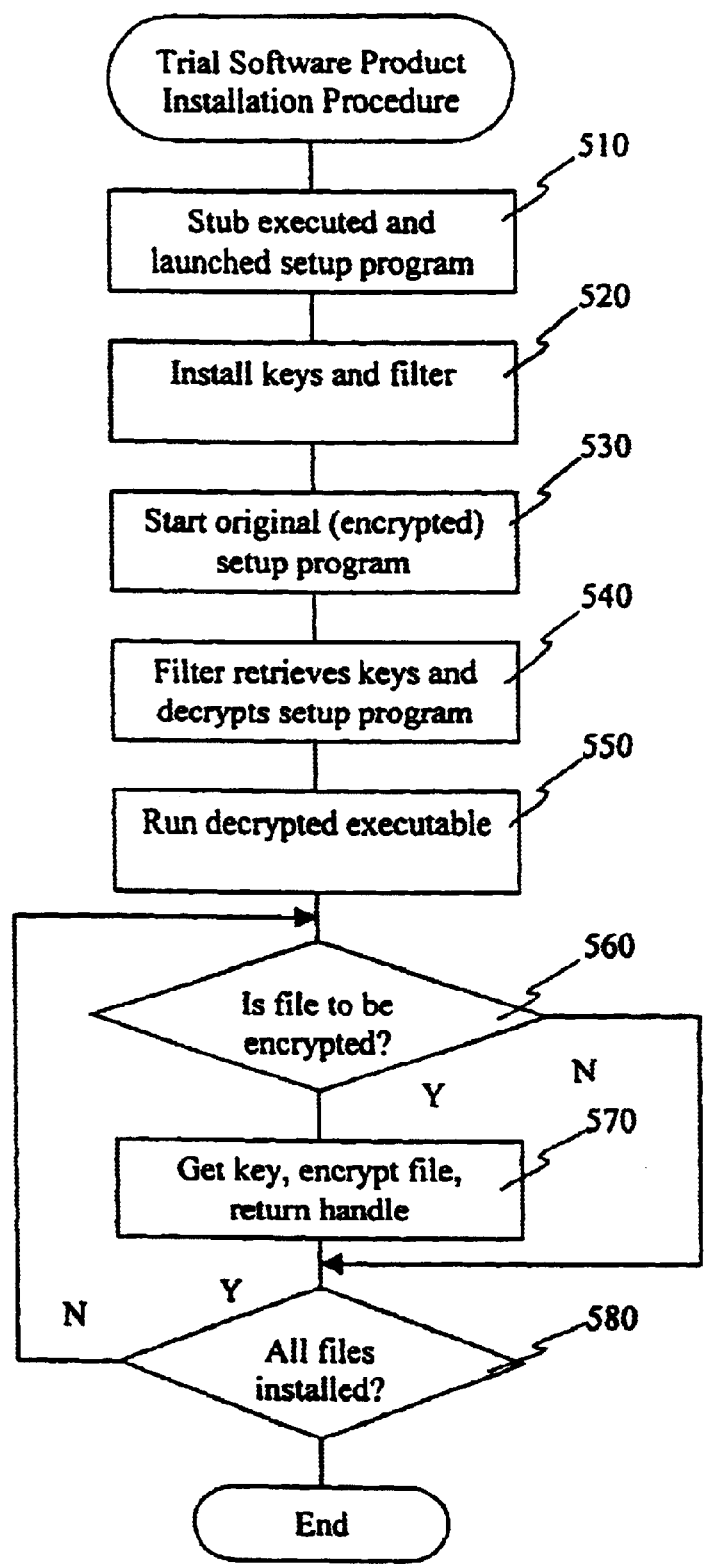
FIG. 5 is a flow diagram illustrating trial software product installation processing according to one embodiment of the present invention.

FIG. 5 is a flow diagram illustrating trial software product installation processing according to one embodiment of the present invention. Basically, the installation process operates by dynamically encrypting the trial software at the file system level. First, the stub starts up and launches the setup program 510. The keys and file system driver are installed 520. As explained above, the file system driver consists of a filter sitting on top of file system. This driver filters file I/O and determines whether to handle the I/O or allow the system to handle it. According to one embodiment of the present invention, an encrypted list of files for the driver to monitor is supplied with the setup program. Alternatively, this list could be supplied with the key data.

Next, the original setup program is launched 530. The filter recognizes that this setup program is encrypted, fetches the keys, and starts loading 540. Setup launches and prepares for product install 550. As setup creates a file the request can be monitored through the OS since the process ID of the setup program is known. If a request is made for a file a determination is made as to whether the file should be encrypted 560 by checking the file requested against the list of protected files 155. If the file should be encrypted 560, the keys are retrieved, the file is encrypted, and the file handle is returned 570. This process is repeated until all files are installed 580.

During the installation process paths are ignored. Encryption is done at the filename level and based on the CRC of the first block of the file. The file monitoring is not looking at filenames, but rather the CRC of the first block written and relative directory from root to determine whether or not it is a file to be encrypted. For example, when an open request to create a file is received, the system handle is returned, put in a table, and subsequent writes and reads are monitored.

No list is kept of encrypted files. This gives the user flexibility to copy, move, and rename files. Therefore, the installation process consists of dynamically encrypting files as the setup program is laying down the files.

After installation an icon will appear on the desktop. When the user double-clicks that icon the trial software will run. The icon is really associated with the stub. When the executable program is encrypted during the manufacturing process the stub is prepackage with icons from original executable. In this way the product is represented as it would be when it is not in a trial mode. The stub launches a control program. This control program dynamically associates the icon with the stub at the time of installation to avoid having to store multiple combinations of stubs with different icons. The control program makes sure the driver is running, determines which process launched it, and check the key for validity.

Run-time Processing

Figure 6:
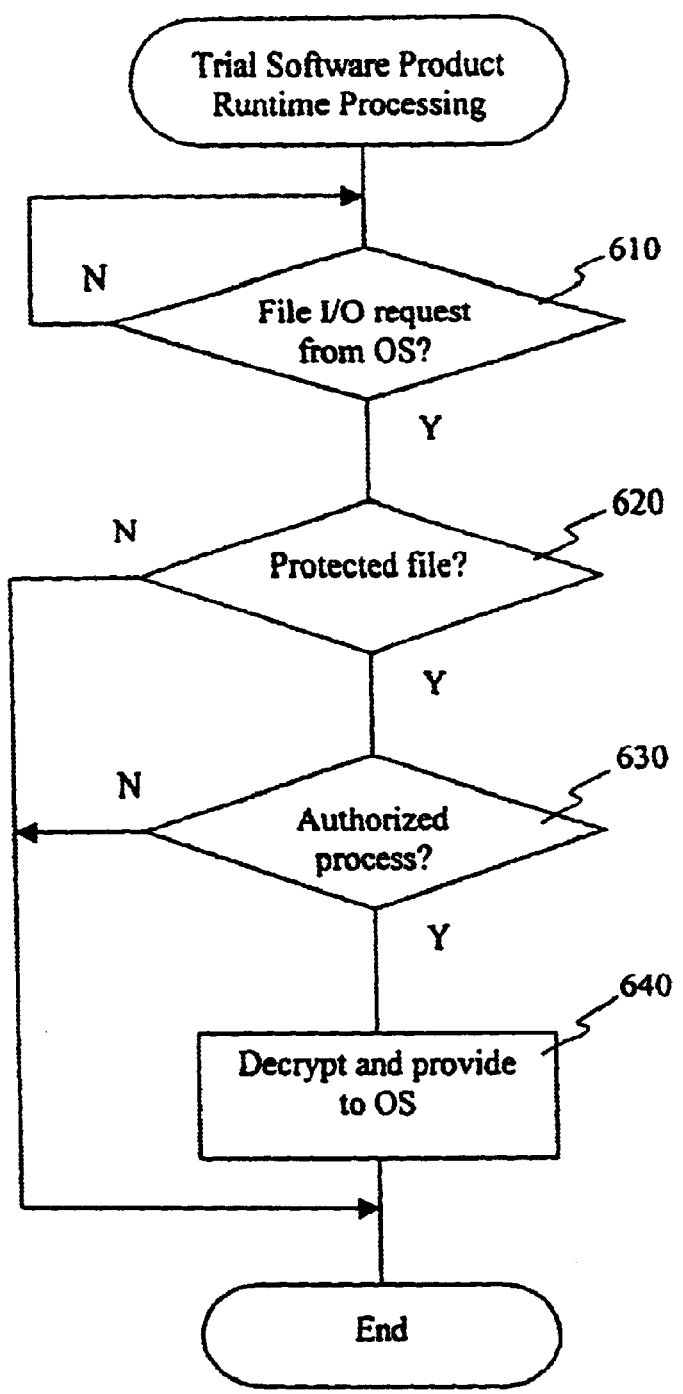
FIG. 6 is a flow diagram illustrating run-time processing of a trial software product according to one embodiment of the present invention.

FIG. 6 is a flow diagram illustrating run-time processing of a trial software product according to one embodiment of the present invention. The filter monitors all trial usage after installation. Briefly, when the trial software is run, a determination is made whether the requesting process can access the keys 610. If the trial software may be run, the keys are accessed 620, the files are dynamically decrypted as needed 630 and the program is executed 640.

The filter limits access to the files by monitoring process IDs. Only certain processes can use keys and decrypt files. Different criteria may be used for determining which processes may use the keys. For example, the most strict method allows only previously decrypted processes to get access. The preferred method relies on the process chain. The process chain is kept in memory for quick access.

Figure 7:
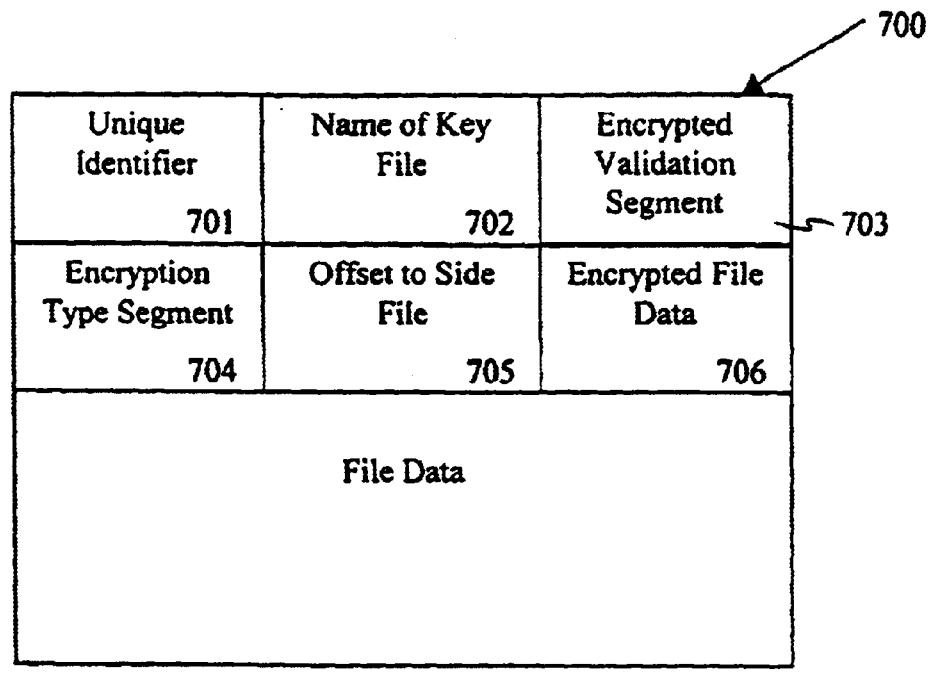
FIG. 7 is a block diagram illustrating an encrypted file with encryption headers according to one embodiment of the present invention.

FIG. 7 graphically depicts an encrypted file with encryption header 700. The encryption header 700 includes a plurality of code segments, including: unique identifier portion 701, the name of the key file portion 702, encrypted validation segment 703, encryption type 704, offset to side file 705, and encrypted file data 706. Of course, in this view, the encrypted file data 706 is representative of the encrypted software product, such as a word processing program or spreadsheet. The encryption header 700 is provided in place of encrypted data which ordinarily would comprise part of the encrypted software product. The encryption header is substituted in the place of the first portion of the encrypted software product. In order to place the encryption header 700 at the front of the encrypted software product of encrypted file data 706, a portion of the encrypted file data must be copied to another location. Offset to side file 705 identifies that side file location where the displaced file data is contained.

Figure 8:
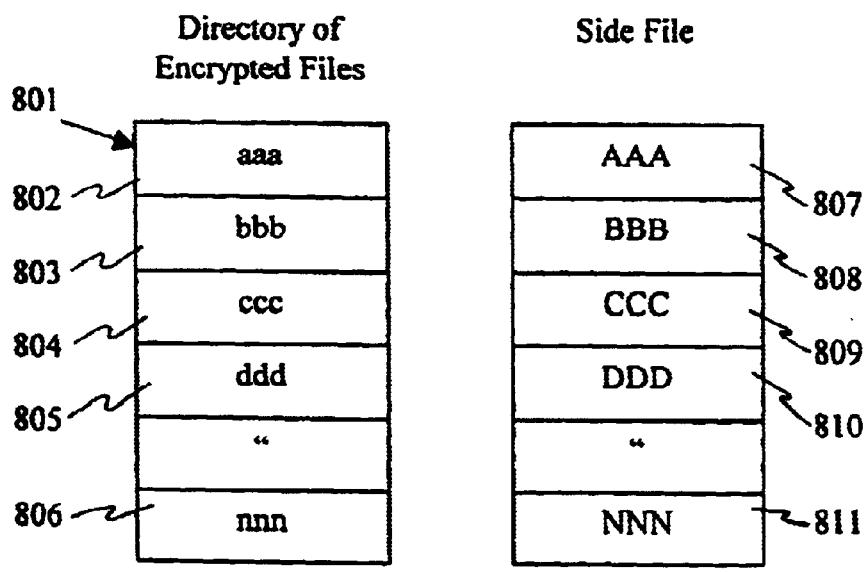
FIG. 8 is a block diagram illustrating the relationship between the directory of encrypted files and the side files according to one embodiment of the present invention.

FIG. 8 graphically depicts the relationship between the directory of encrypted files and the side files. As is shown, the directory of encrypted files 801 includes file aaa, file bbb, file ccc, file ddd, through file nnn. Each of these files is representative of a directory name for a particular encrypted software product. Each encrypted software product has associated with it a side file which contains the front portion of the file which has been displaced to accommodate encryption header 700 in FIG. 7 without altering the size of the file; and without altering the file name. File aaa has associated with it a side file AAA. Software product file bbb has associated with it a side file BBB. Encrypted software product ccc has associated with it a side file CCC. Encrypted software product ddd has associated with it a side file DDD. Encrypted software product nnn has associated with it a side file NNN. In FIG. 8, directory names 802, 803, 804, 805, 806 are depicted as being associated with side files 807, 808, 809, 810, and 811. The purpose of the side files is to allow each of the encrypted software products to be tagged with an encryption header without changing the file size.

Encryption type segment 704 of the encryption header 700 in FIG. 7 identifies the type of encryption utilized to encrypt the encrypted software product. Any one of a number of conventional encryption techniques can be utilized to encrypt the product, and different encryption types can be utilized to encrypt different software products contained on the same memory media. Encryption type segment 704 ensures that the appropriate encryption/decryption routine is called so that the encrypted software product may be decrypted, provided the temporary access keys are valid and not expired. The name of key file segment 702 of encryption header 700 provides an address (typically a disk drive location) of the key file. The key file includes the product key, a customer key, and the clear machine ID. All three of these pieces of information are used to generate the real key. Encrypted validation segment 703 includes the encrypted validation text which is utilized in a routine which generates a derived clear validation text which may be compared to the known clear validation text. Only if the derived clear validation text exactly matches the known clear validation text can the process continue by utilizing the derived and validated real key to decrypt the encrypted software product. However, prior to performing the decryption operations, the contents of the corresponding side file must be substituted back into the encrypted software product in lieu of encryption header 700. This ensures that the encrypted software product is complete prior to the commencement of decryption operations.

Each time a file is called for processing by the operating system of the user-controlled data processing system, the filter which is called by the filter in response to input/output requests intercepts the input/output requests and examines the front portion of the file by checking the process chain to determine if a decryption block identifier, such as unique identifier 701, exists at a particular known location. For best performance, as is depicted in FIG. 7, this location will generally be at the beginning of the file. If the filter determines that the file has the decryption block, the filter will read the block into memory. The block is then parsed in order to build a fully qualified key file name by copying an environment variable that specifies the drive and directory containing the key files and concatenating the key file name from the encryption block. The filter then attempts to open the key file. If the key file does not exist, the filter returns an 'access denied' response to the application which is attempting to open the encrypted file. If the key file is determined to exist, the filter opens the key file and reads in the keys (the product key, the customer key, and the machine identification) and generates the real key. This real key is in use to decrypt the decryption block validation data. As is stated above, a comparison operation determines whether this decryption operation was successful. If the compare fails, the key file is determined to be 'invalid', and the filter returns an 'access denied message' to the application which is attempting to open the encrypted software product. However, if the compare is successful, the filter prepares to decrypt the file according to the encryption type found in the encryption header. The filter then returns a valid file handle to the calling application to indicate that the file has been opened. When the application reads data from the encrypted file, the filter reads and decrypts this data before passing it back to the application. If the data requested is part of the displaced data that is stored in the side file, the filter will read the side file and return the appropriate decrypted block to the calling application without the calling application being aware that the data came from a separate file.

Figures 9, 10:
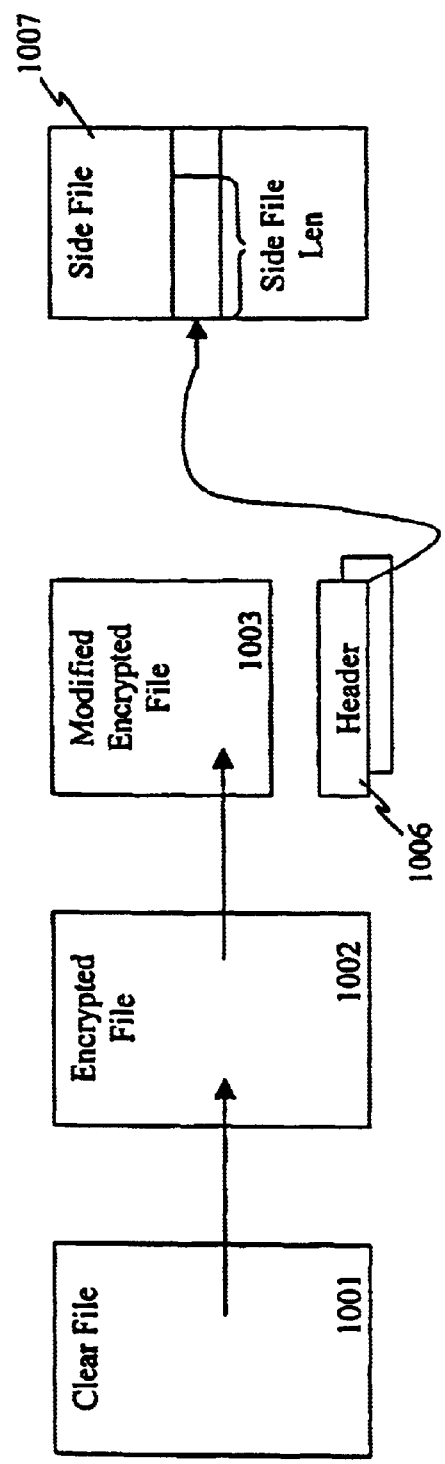
FIG. 9 is a block diagram illustrating one possible type of header according to one embodiment of the present invention.
FIG. 10 is a block diagram illustrating an encryption process according to one embodiment of the present invention.
Figure 11:
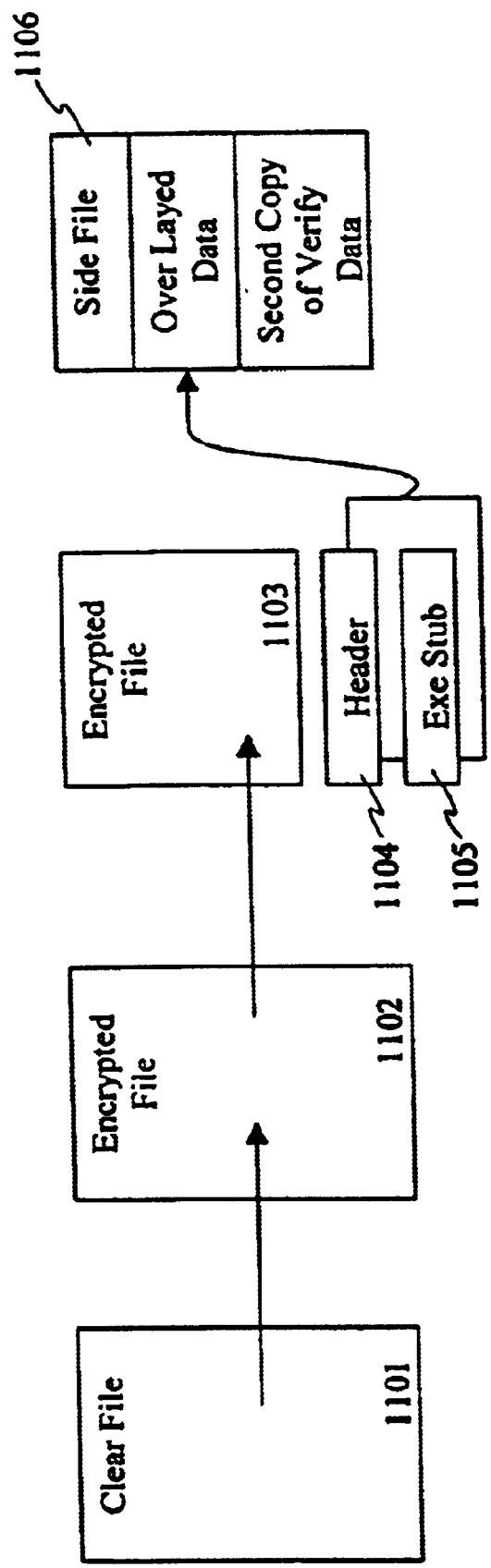
FIG. 11 is a block diagram illustrating another encryption scheme according to another embodiment of the present invention.

While the broad concepts of the encryption header have been described with reference to FIGS. 7 and 8, the more particular aspects of creating the encrypted files are depicted in FIGS. 9, 10, and 11. FIGS. 10 and 11 depict two types of data files. FIG. 11 depicts a non-executing data file, while FIG. 11 depicts an executing data file. FIG. 9 depicts a header which includes signature segment 901, header LEN 902, side file index 903, side file LEN 904, decryption type identifier 905, verification data 906, and key file name 907. As is shown in FIG. 10, a software product begins as a clear file 1001, and is encrypted in accordance with a particular encryption routine into encrypted file 1002. Encryption type segment 905 of header 1006 identifies the type of encryption utilized to change clear file 1001 to encrypted file 1002. Next, the front portion of encrypted file 1002 is copied to side file 1007 which is identified by side file index 903 and side file LEN 904 of header 1006. Additionally, a copy of the clear text of the verification data is also included in side file 1007. Then, header 1006 is copied to the front portion of encrypted file 1002 to form modified encrypted files 1003. A similar process is employed for executing files, as depicted in FIG. 11. The clear text copy of the software product (represented as clear file 1101) is encrypted in accordance with a conventional routine, to form encrypted file 1102. The front portion of encrypted file 1102 is copied to side file 1106 so that the overlaid data of encrypted file 1102 is preserved. Furthermore, side file 1106 includes a copy of the clear text of the verification data. Then, the encrypted file 1102 is modified by overlaying an executable stub 1105 and header 1104 onto the first portion of the encrypted file 1103.

The purpose of executable stub 1105 of FIG. 11 will now be described. The executable stub 1105 of the executing file of FIG. 11 is utilized to protect the user from attempting to execute applications that are encrypted. The executable stub is attached to the front portion of the encrypted software product so that this stub is executed whenever the application is run without the installed filter. This stub will post a message to the user that explains why the application cannot run. In addition to providing a message, this executable stub can be used to perform sophisticated actions, such as duplicating the functionality of the filter and installing dynamic encryption before kicking off the application a second time or it can turn on a temporary access key and kick off the application a second time.

The executable stub is saved or copied into the encrypted program as follows: (1) the application is encrypted; (2) a decryption block is created for this program; (3) a pre-built executable stub is attached to the front end of the decryption block; (4) the length of the combined decryption header and executable stub is determined; (5) the bytes at the front of the executable file equal to this length are then read into memory, preferably into a predefined side file location; and (6) the encryption header and executable stub are then written over the leading bytes in the executable code.

The filter can determine if an executable is encrypted by searching beyond the 'known size' of the executable stub for the decryption block portion. When the filter decrypts the executable stub it accesses the side file to read in the bytes that were displaced by the stub and header block.

According to one embodiment, the encryption and decryption algorithms for generating various types of keys are as disclosed in U.S. Pat. No. 5,319,705, entitled "Method and System for Multimedia Access Control Enablement" which is incorparated herein by reference.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of creating a trial software product on a target system, the method comprising:

responsive to a user request to initiate installation of a software product, loading a filter onto the target system;

launching an installation process associated with the software product, the installation process configured to transfer product files comprising the software product onto the target system;

the filter dynamically creating a trial software product from the software product by intercepting file system calls from the installation process, and responsive to a write request from the installation process, encrypting data on the target system associated with the write request if the write request is associated with one of a predetermined set of product files;

intercepting file system calls requesting access to a file;

determining whether the file requested is a protected file;

if the file requested is a protected file, determining whether access is authorized; and if access is authorized, dynamically decrypting the requested file.

2. The method of claim 1, wherein creation of said trial software product does not require a modified version of either the product code or the installation program associated with the software product.

3. The method of claim 1, wherein said creation of said trial software product is done dynamically as the product files are installed onto the target system.

4. The method of claim 1, wherein said trial software product is tailored to an individual user's intended use by allowing the individual user to supply installation preferences.

5. The method of claim 1, wherein said installation includes associating one or more icons harvested from the software product with one or more executables of the software product.

6. The method of claim 1, wherein said determinations are performed by a filter loaded onto the target system.

7. A system comprising:

a storage device having stored therein a routine to create a trial software product on a target system; and a processor coupled to the storage device to execute the routine to create the trial software product, wherein the processor, responsive to a user request to initiate installation of a software product, loads a filter onto the target system, launches an installation process associated with the software product, the installation process to transfer product files comprising the software product onto the target system, dynamically creates a trial software product from the software product by intercepting file system calls from the installation process, and responsive to a write request from the installation process, encrypting data on the target system associated with the write request if the write request is associated with one of a predetermined set of product files, intercepts file system calls requesting access to a file, determines whether the file requested is a protected file, if the file requested is a protected file, determines whether access is authorized, and if access is authorized, dynamically decrypts the requested file.

8. The system of claim 7, wherein creation of said trial software product does not require a modified version of either the product code or the installation program associated with the software product.

9. The system of claim 7, wherein said creation of said trial software product is done dynamically as the product files are installed onto the target system.

10. The system of claim 7, wherein said trial software product is tailored to an individual user's intended use by allowing the individual user to supply installation preferences.

11. The system of claim 7, wherein said installation includes associating one or more icons harvested from the software product with one or more executables of the software product.

12. The system of claim 7, wherein said determinations are performed by a filter loaded onto the target system.

13. A machine readable medium containing instructions which, when executed by a processor cause the processor to:

responsive to a user request to initiate installation of a software product, load a filter onto the target system;

launch an installation process associated with the software product, the installation process to transfer product files comprising the software product onto the target system;

the filter to dynamically create a trial software product from the software product by intercepting file system calls from the installation process, and responsive to a write request from the installation process, encrypting data on the target system associated with the write request if the write request is associated with one of a predetermined set of product files;

intercepts file system calls requesting access to a file;

determines whether the file requested is a protected file;

if the file requested is a protected file, determines whether access is authorized; and if access is authorized, dynamically decrypts the requested file.

14. The machine readable medium of claim 13, wherein creation of said trial software product does not require a modified version of either the product code or the installation program associated with the software product.

15. The machine readable medium of claim 13, wherein said creation of said trial software product is done dynamically as the product files are installed onto the target system.

16. The machine readable medium of claim 13, wherein said trial software product is tailored to an individual user's intended use by allowing the individual user to supply installation preferences.

17. The machine readable medium of claim 13, wherein said installation includes associating one or more icons harvested from the software product with one or more executables of the software product.

18. The machine readable medium of claim 13, wherein said determinations are performed by a filter loaded onto the target system.

* * * * *